(12) United States Patent
Onda

(10) Patent No.: US 8,853,304 B2
(45) Date of Patent: Oct. 7, 2014

(54) POLYESTER COMPOSITIONS AND INSERT-MOLDED ARTICLES MADE THEREFROM

(75) Inventor: Kayoko Onda, Tochigi (JP)

(73) Assignee: Sabic Innovative Plastics IP B.V. (NL)

( * ) Notice: Subject to any disclaimer, the term of this patent is extended or adjusted under 35 U.S.C. 154(b) by 2 days.

(21) Appl. No.: 13/305,853

(22) Filed: Nov. 29, 2011

(65) Prior Publication Data

US 2013/0137797 A1 May 30, 2013

(51) Int. Cl.
*C08L 67/00* (2006.01)

(52) U.S. Cl.
USPC ............ 523/500; 524/599; 524/505; 523/436

(58) Field of Classification Search
None
See application file for complete search history.

(56) References Cited

U.S. PATENT DOCUMENTS

| | | | |
|---|---|---|---|
| 2,465,319 A | 3/1949 | Whinfield | |
| 3,047,539 A | 7/1962 | Pengilly | |
| 5,367,011 A | 11/1994 | Walsh | |
| 5,411,999 A | 5/1995 | Gallucci | |
| 6,346,320 B2 | 2/2002 | Doteguchi et al. | |
| 6,512,027 B2 | 1/2003 | Kanai et al. | |
| 7,091,269 B2 | 8/2006 | Takesue et al. | |
| 7,674,192 B2 * | 3/2010 | Nanba et al. | 473/376 |
| 2003/0083422 A1 | 5/2003 | Chen | |
| 2007/0092748 A1 * | 4/2007 | Suzuki et al. | 428/500 |
| 2007/0129475 A1 | 6/2007 | Sakata et al. | |
| 2008/0246192 A1 * | 10/2008 | Kim et al. | 264/500 |
| 2008/0300334 A1 | 12/2008 | Masuda et al. | |
| 2009/0294043 A1 | 12/2009 | Aihara et al. | |
| 2010/0266857 A1 * | 10/2010 | Sakata et al. | 428/451 |
| 2012/0028063 A1 | 2/2012 | Sakata | |
| 2012/0205136 A1 * | 8/2012 | Moriuchi et al. | 174/110 SR |

FOREIGN PATENT DOCUMENTS

| | | | |
|---|---|---|---|
| JP | 2011-99084 | * | 5/2011 |
| WO | 03/066704 A1 | | 8/2003 |

OTHER PUBLICATIONS

Glass Fiber Chopped Strands Product Code Indication, (n.d.), retrived from www.nittobo.co.jp/english/glassfiber/reinforcement/chop_frp.htm.*
Indukuri et al. Comparative deformational characteristics of poly-(styrene-b-ethylene-co-butylene-b-styrene) thermoplastic elastomers and crosslinked natural ribber. Polymer 46 (2005) 7218-7229.*
JSR Dynaron, Hydrogenated polymer, dowloaded Jul. 28, 2010, 10 pages.
International Searching Authority, International Search Report, PCT/IB2012/056842, Date of mailing: May 2, 2013, 5 pages.
International Searching Authority, Written Opinion of the International Searching Authority, PCT/IB2012/056842, Date of mailing: May 2, 2013, 6 pages.

* cited by examiner

*Primary Examiner* — Susannah Chung
*Assistant Examiner* — Robert T Butcher
(74) *Attorney, Agent, or Firm* — Cantor Colburn LLP

(57) ABSTRACT

A thermoplastic polyester composition comprises polyalkylene terephthalate, a block copolymer comprising a semicrystalline polyolefin block and at least one of a vinyl aromatic polymer block and an elastomeric polyolefin block, and reinforcing filler. The composition is capable of providing insert-molded articles, comprising a metal part, with high durability and resistance to cracking when subjected to a rigorous thermal cycle.

10 Claims, 1 Drawing Sheet

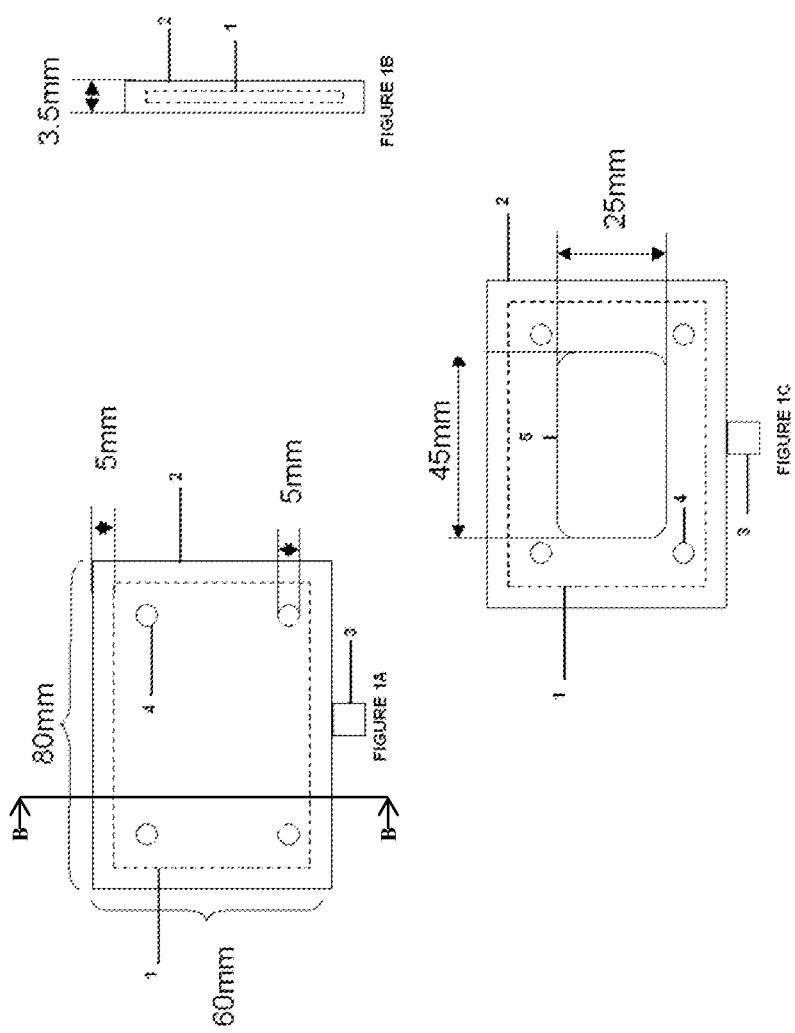

POLYESTER COMPOSITIONS AND INSERT-MOLDED ARTICLES MADE THEREFROM

BACKGROUND

This disclosure relates to polyester compositions and articles made therefrom. In particular, insert-molded articles having excellent heat cycle resistance can be obtained by insert molding of the polyester compositions with a metal insert.

Thermoplastic polyester compositions, such as poly(alkylene terephthalates), have valuable characteristics including mechanical strength, toughness, high gloss, and solvent resistance. Polyesters, therefore, have utility as materials for a wide range of applications, from automotive parts to electrical and electronic appliances. Automotive applications include metal-insert molded articles in which the metal inserts are placed inside of plastics. Such applications, however, usually require high durability even when subjected to a strenuous thermal cycle, for example, in an environment ranging from below 0° C. to over 100° C.

In particular, polyalkylene terephthalate compositions including glass reinforcing fibers have been used in insert-molded articles in which a metal part is embedded in a resin composition in order to take advantage of the properties of both the resin composition and the metal. Metal inserts have included, for example, aluminum, copper, iron, and brass. A continuing problem in obtaining such insert-molded articles, however, has been that they can still suffer from cracking when subjected, during use, to extreme temperature change, since the expansion and shrinkage coefficient (so-called liner expansion coefficient) can differ widely between the resin and metal portions of the insert-molded article.

Insert-molded articles have been applied in a wide variety of fields, including automobile parts and electrical or electronic parts. In particular, important applications of insert molding have been occurring in the automotive industry for use in making automotive parts located near an engine, the environment of which can greatly increase the need for heat cycle resistance. For example, insert-molded articles have been considered for use in parts of the automotive ignition system and distributor. Such insert-molded articles, however, can require even higher heat cycle resistant capabilities than previous applications. This challenge is increased by the fact that such insert-molded articles can have complicated structures, for examples, in which the thickness or shape of the resin composition can vary considerably in the article. Such complicated structures are especially prone to cracking. Therefore, uses and shapes of insert-molded articles have been undesirably limited and there remains a need for insert-molded articles having improved resistance to increasingly rigorous thermal cycles.

U.S. Pat. No. 6,512,027 discloses a resin composition comprising polybutylene terephthalate, glass fibers, and an impact resistance agent that is an epoxy-functionalized olefinic elastomer such as a graft copolymer of ethylene-glycidyl methacrylate-methyl methacrylate (EGMA-g-MMA), epoxy-modified styrene-butadiene-styrene block copolymer (ESBS), and epoxy-modified styrene-butadiene-styrene block copolymer (ESBS), which resin composition is designed for heat cycle resistance in metal-inserted parts.

U.S. Pat. No. 6,346,320 discloses a polyester resin composite molded article having thermal shock resistance that comprises polybutylene terephthalate, an inorganic filler, and, as an impact modifier, a modified ethylenic copolymer produced by graft-polymerization of maleic anhydride or other carboxylic acid anhydride, which copolymer is in the form of dispersed particles. Comparative impact modifiers in U.S. Pat. No. 6,346,320 include ethylene-glycidyl methacrylate-methyl acrylate copolymer.

US 2010/0266857 discloses a resin composition comprising polybutylene terephthalate, glass fibers, and a styrenic thermoplastic elastomer such as SEBS and epoxy-functionalized SBS, which can improve heat cycle resistance of metal inserted molded parts.

In view of the above, there remains a strong need for resin compositions for insert-molded articles, comprising a metal insert, that can endure even more rigorous changes between higher temperatures and lower temperatures over a long period of time, namely resin compositions providing excellent heat cycle resistance, including heat shock resistance, which resin compositions can, at the same time, exhibit other desirable mechanical properties such as flexural strength.

BRIEF SUMMARY OF THE INVENTION

In view of the above-described problems, the present invention is directed to a composition comprising, based on the total weight of the composition, from 40 to 94 weight percent (wt. %) of polyalkylene terephthalate, from 5 to 50 wt. % of reinforcing filler; and from 1 to 30 wt. % of a functionalized or non-functionalized block copolymer comprising a semi-crystalline polyolefin block and at least one of a vinyl aromatic polymer block and an elastomeric polyolefin block (either functionalized or non-functionalized), also referred to herein as a "semi-crystalline-polyolefin-containing block copolymer." The functionalized semi-crystalline-polyolefin-containing block copolymer can comprises amine or epoxy functionality, specifically an epoxy group, more specifically terminal epoxy groups.

Also disclosed is a thermoplastic polyester composition comprising, based on the weight of the composition. A thermoplastic polyester composition comprising, based on the total weight of the composition, from 49 to 88 wt. % of polyalkylene terephthalate; from 1 to 20 wt. % of an epoxy-functional block copolymer comprising a semi-crystalline polyolefin block and at least one of a vinyl aromatic polymer block and an elastomeric polyolefin block; from 1 to 20 wt. % of carboxy-reactive impact modifier; and from 10 to 40 wt. % of reinforcing filler.

Such compositions have been found to have excellent heat cycle resistance for use in making insert-molded articles that show little or no cracking by temperature change.

Also disclosed is an insert-molded article comprising a molded thermoplastic polyester containing a metal part, wherein thermoplastic polyester composition comprises, based on the total weight of the composition, from 40 to 94 wt. % of a polyalkylene terephthalate; from 1 to 30 wt. % of a functionalized or non-functionalized block copolymer comprising a semi-crystalline polyolefin block and at least one of a vinyl aromatic polymer block and an elastomeric polyolefin block; and from 5 to 50 wt. % of a reinforcing filler.

The thermoplastic polyester composition can exhibit a tensile elongation of greater than 3 percent as measured in accordance with ASTM D638, and insert-molded articles made therefrom can exhibit a heat cycle rating of less than or equal to 6 cracked holes after 385 cycles according to the heat cycle resistance test described herein.

BRIEF DESCRIPTION OF THE DRAWINGS

FIG. 1A is a schematic diagram of a front view of an insert-molded article for testing heat cycle resistance as discussed in the examples herein.

FIG. 1B is a schematic diagram of a side view of the insert-molded article of FIG. 1A along line B-B.

FIG. 1C is a schematic diagram of a back view of the insert-molded article of FIG. 1A showing a window as an example of a particular shape in forming the insert-molded article, subject to testing for heat cycle resistance as discussed in the examples herein.

DETAILED DESCRIPTION OF THE INVENTION

Our invention is based on the discovery that it is possible to make a filler-reinforced composition that provides excellent heat cycle resistance when used to make an inserted-molded article. An unexpectedly high level of heat cycle performance was obtained, however, by using a combination of a polyalkylene terephthalate, a functionalized or non-functionalized block copolymer that comprises a semi-crystalline polyolefin block and at least one of a vinyl aromatic polymer block and an elastomeric polyolefin block, and a reinforcing filler.

In one embodiment, the block copolymer comprises a semi-crystalline polyolefin block and an elastomeric polyolefin block. In another embodiment, the block copolymer comprises a semi-crystalline polyolefin block and both of a vinyl aromatic polymer block and an elastomeric polyolefin block. The semi-crystalline polyolefin block can be located at one or both terminal ends of a linear block copolymer. In one embodiment, the block copolymer consists of three blocks.

Another aspect of our invention is based on the discovery that by the use of the functionalized or non-functionalized block copolymer, comprising a semi-crystalline polyolefin block and at least one of a vinyl aromatic polymer block and an elastomeric polyolefin block, in further combination with a carboxy-reactive impact modifier, still further improvements in a desired balance of properties that includes heat cycle performance can be obtained.

Specifically, in one embodiment, a composition comprising a combination of an epoxy-functionalized block copolymer, comprising a semi-crystalline polyolefin block and at least one of a vinyl aromatic polymer block and an elastomeric polyolefin block, with a carboxy-reactive impact modifier, specifically a copolymer comprising epoxy-functionalized acrylic monomers, was found to provide a highly desired balance of improved heat cycle performance and other mechanical properties. For example, polyester compositions of the present invention can also provide a highly advantageous combination of impact strength, flexural strength, tensile strength, heat stability, and/or melt flow properties, in addition to high resistance against thermal cycles.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount. Weight percentages of claimed components in the composition herein described, in corresponding parts by weight, can alternatively add up to 100 parts by weight, optionally combined with other components.

All ASTM tests and data are from the 2003 edition of the Annual Book of ASTM Standards unless otherwise indicated. All cited references are incorporated herein by reference.

For the sake of clarity, the terms "terephthalic acid group," "isophthalic acid group," "butanediol group," and "ethylene glycol group" have the following meanings. The term "terephthalic acid group" in a composition refers to a divalent 1,4-benzene radical ($-1,4-(C_6H_4)-$) remaining after removal of the carboxylic groups from terephthalic acid-. The term "isophthalic acid group" refers to a divalent 1,3-benzene radical ($-(-1,3-C_6H_4)-$) remaining after removal of the carboxylic groups from isophthalic acid. The "butanediol group" refers to a divalent butylene radical ($-(C_4H_8)-$) remaining after removal of hydroxyl groups from butanediol. The term "ethylene glycol group" refers to a divalent ethylene radical ($-(C_2H_4)-$) remaining after removal of hydroxyl groups from ethylene glycol. With respect to the terms "terephthalic acid group," "isophthalic acid group," "ethylene glycol group," "butane diol group," and "diethylene glycol group" being used in other contexts, e.g., to indicate the weight % of the group in a composition, the term "isophthalic acid group(s)" means the group having the formula ($-O(CO)C_6H_4(CO)-$), the term "terephthalic acid group" means the group having the formula ($-O(CO)C_6H_4(CO)-$), the term diethylene glycol group means the group having the formula ($-O(C_2H_4)O(C_2H_4)-$), the term "butanediol group" means the group having the formula ($-O(C_4H_8)-$), and the term "ethylene glycol groups" means the group having formula ($-O(C_2H_4)-$).

The thermoplastic polyester composition comprises polyalkylene terephthalate. Examples of polyalkylene terephthalate are polymers selected from the group polyethylene terephthalate ("PET"), poly(1,4-butylene terephthalate) ("PBT"), polypropylene terephthalate ("PPT"), polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylylene terephthalate, polydianol terephthalates, and combinations thereof. Stable polyblends of two or more of the polyesters, such as blends of poly(1,4-butylene terephthalate) and polyethylene terephthalate also can be used.

The term "polybutylene terephthalate" or PBT polyester includes both unmodified and modified PBT, as defined below, and combinations thereof.

The polyalkylene terephthalate can be a copolyester derived from terephthalic acid (specifically terephthalic acid and/or isophthalic acid) and a mixture comprising a linear C2-6 aliphatic diol (specifically ethylene glycol and butylene glycol); and a C6-12 cycloaliphatic diol (specifically 1,4-cyclohexane diol, dimethanol decalin, dimethanol bicyclooctane, 1,4-cyclohexane dimethanol and its cis- and trans-isomers, 1,10-decane diol, and the like). The ester units comprising the two or more types of diols can be present in the polymer chain as individual units or as blocks of the same type of units. Specific esters of this type include poly(1,4-cyclohexylene dimethylene co-ethylene terephthalate)

(PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PTCG).

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). An example of a thermoplastic poly(ester-ether) (TPEE) copolymer is poly(ethylene-co-poly(oxytetramethylene) terephthalate. Such polyesters can be made following the teachings of, for example, U.S. Pat. Nos. 2,465,319 and 3,047,539.

It is to be understood that polyalkylene terephthalate can include small amounts of isophthalate esters or other monomers, specifically less than 10 wt. %, more specifically less than 5 wt. %, most specifically less than 2 wt. % of monomers other than terephthalate, isophthalate groups, or alkylene groups.

In order to attain the desired combination of heat cycle resistance and other desired properties, the polyalkylene terephthalate has a weight average molecular weight of greater than or equal to 40,000 g/mol or greater, specifically 70,000 to 200,000 g/mol, against polystyrene standards, as measured by gel permeation chromatography in chloroform/hexafluoroisopropanol (5:95, volume/volume ratio) at 25° C. The polyalkylene terephthalate can have an intrinsic viscosity (as measured in phenol/tetrachloroethane (60:40, volume/volume ratio) at 25° C.) of 0.5 or 0.8 to 2.0 deciliters per gram.

The polyalkylene terephthalate can be obtained by methods well known to those skilled in the art, including, for example, interfacial polymerization, melt-process condensation, solution phase condensation, and transesterification polymerization. Such polyalkylene terephthalate resins are typically obtained through the condensation or ester interchange polymerization of the diol or diol equivalent component with the diacid or diacid chemical equivalent component. Methods for making polyalkylene terephthalate and the use of such polyesters in thermoplastic molding compositions are known in the art. Conventional polycondensation procedures are described in the following patents, generally, U.S. Pat. Nos. 2,465,319, 5,367,011 and 5,411,999. The condensation reaction can be facilitated by the use of a catalyst, with the choice of catalyst being determined by the nature of the reactants. The various catalysts are known in the art. For example, a dialkyl ester such as dimethyl terephthalate can be transesterified with butylene glycol using acid catalysis, to generate polybutylene terephthalate. It is possible to use branched polyalkylene terephthalate in which a branching agent, for example, a glycol having three or more hydroxyl groups or a trifunctional or multifunctional carboxylic acid has been incorporated.

In one embodiment, the polyalkylene terephthalate component is poly(1,4-butylene terephthalate) or "PBT" resin and is obtained by polymerizing a glycol component at least 70 mol %, preferably at least 80 mol %, of which consists of tetramethylene glycol and an acid or ester component at least 70 mol %, preferably at least 80 mol %, of which consists of terephthalic acid, and polyester-forming derivatives therefore. Commercial examples of PBT include those available under the trade names VALOX 315 and VALOX 195, manufactured by SABIC Innovative Plastics, having an intrinsic viscosity of 0.4 to about 2.0 dl/g as measured in a 60:40 phenol/tetrachloroethane mixture or similar solvent at 23°-30° C. In one embodiment, the PBT resin has an intrinsic viscosity of 0.6 to 1.4 dl/g.

In one embodiment, the polyalkylene terephthalate component comprises a modified polybutylene terephthalate, that is, a PBT polyester derived from poly(ethylene terephthalate), for example waste PET such as soft drink bottles. The PET-derived PBT polyester (referred to herein for convenience as "modified PBT") (1) can be derived from a poly(ethylene terephthalate) component selected from the group consisting of poly(ethylene terephthalate), poly(ethylene terephthalate) copolymers, and a combination thereof, and (2) has at least one residue derived from the poly(ethylene terephthalate) component. The modified PBT can further be derived from a biomass-derived 1,4-butanediol, e.g., corn derived 1,4-butanediol or a 1,4-butanediol derived from a cellulosic material. Unlike conventional molding compositions containing virgin PBT (PBT that is derived from monomers), the modified PBT contains a poly(ethylene terephthalate) residue, e.g., a material such as ethylene glycol and isophthalic acid groups (components that are not present in virgin, monomer-based PBT). Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., $CO_2$.

The residue derived from the poly(ethylene terephthalate) component and which is present in the modified PBT can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as the type and relative amounts of poly(ethylene terephthalate) and poly(ethylene terephthalate) copolymers, the residue can include various combinations. For example, the residue can include mixtures of ethylene glycol groups and diethylene glycol groups. The residue can also include mixtures of ethylene glycol groups, diethylene glycol groups, and isophthalic acid groups. The residue derived from poly(ethylene terephthalate) can include the cis isomer of 1,3-cyclohexane dimethanol groups, the cis isomer of 1,4-cyclohexane dimethanol groups, the trans isomer of 1,3-cyclohexane dimethanol groups, the trans isomer of 1,4-cyclohexane dimethanol groups, or combinations thereof. The residue can also be a mixture of ethylene glycol groups, diethylene glycol groups, isophthalic acid groups, cis isomer of cyclohexane dimethanol groups, trans isomer of cyclohexane dimethanol groups, or combinations thereof. The residue derived from poly(ethylene terephthalate) can also include mixtures of ethylene glycol groups, diethylene glycol groups, and cobalt-containing compounds. Such cobalt-containing compound mixture can also contain isophthalic acid groups.

The amount of the ethylene glycol groups, diethylene glycol groups, and isophthalic groups in the polymeric backbone of the modified PBT component can vary. The modified PBT ordinarily contains isophthalic acid groups in an amount that is at least 0.1 mole % and can range from 0 or 0.1 to 10 mole % (0 or 0.07 to 7 wt. %). The modified PBT component ordinarily contains ethylene glycol in an amount that is at least 0.1 mole % and can range from 0.1 to 10 mole % (0.02 to 2 wt. %). In an embodiment, the modified PBT component has an ethylene glycol content that is more than 0.85 wt. %. In another embodiment, compositions can contain ethylene glycol in an amount from 0.1 to 2 wt. %. The modified PBT component can also contain diethylene glycol in an amount from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments. Unless otherwise specified, all molar amounts of the isophthalic acid groups and/or terephthalic acid groups are based on the total moles of diacids/diesters in the composition. Unless otherwise specified, all molar amounts of the butanediol, ethylene glycol, and diethylene glycol groups are based on the total moles of diol in the composition. These weight percent measurements are based on the above definitions of terephthalic acid groups, isophthalic acid groups, ethylene glycol groups, and diethylene glycol groups.

The total amount of the poly(ethylene terephthalate) component residue in the modified PBT can vary in amounts from 1.8 to 2.5 wt. %, or from 0.5 to 2 wt. %, or from 1 to 4 wt. %, based on the total weight of the modified PBT. The ethylene glycol, diethylene glycol, and cyclohexane dimethanol groups can be present, individually or in combination, in an amount from 0.1 to 10 mole %, based on 100 mole % of glycol in the molding composition. The isophthalic acid groups can be present in an amount from 0.1 to 10 mole %, based on 100 mole % of diacid/diester in the molding composition.

When it is desirable to make a polybutylene terephthalate copolymer having a melting temperature $T_m$ that is at least 200° C., the total amount of diethylene glycol, ethylene glycol, and isophthalic acid groups should be within a certain range. As such, the total amount of the diethylene glycol, ethylene glycol, and isophthalic acid groups in the modified polybutylene terephthalate component can be more than 0 and less than or equal to 23 equivalents, relative to the total of 100 equivalents of diol and 100 equivalents of diacid groups in the modified PBT. The total amount of the isophthalic acid groups, ethylene glycol groups, and diethylene glycol groups can be from 3 to less than or equal to 23 equivalents, relative to the total of 100 equivalents of diol and 100 equivalents of diacid groups in the PET-derived PBT. Alternatively, the total amount of the isophthalic acid groups, ethylene glycol groups, and diethylene glycol groups can be from 3 to less than or equal to 10 equivalents, relative to the total of 100 equivalents of diol and 100 equivalents of diacid groups in the modified PBT. Still further, the total amount of the isophthalic acid groups, ethylene glycol groups, and diethylene glycol groups can be from 10 to less than or equal to 23 equivalents, relative to the total of 100 equivalents of diol and 100 equivalents of diacid groups in the modified PBT. The diethylene glycol, ethylene glycol, and/or isophthalic acid can be added during the process.

The total ethylene glycol groups, isophthalic acid groups, and diethylene glycol groups can vary, depending on the application needs. The composition can have total monomer content selected from the group consisting of ethylene glycol, isophthalic acid groups, and diethylene glycol groups in an amount from more than 0 and less than or equal to 17 equivalents relative to the total of 100 equivalents of diol and 100 equivalents of diacid groups in the modified PBT. Advantageously, such compositions can maintain useful properties, such as heat deflection temperatures that are more than 80° C.

The total amount of inorganic residues derived from the poly(ethylene terephthalate) can be present from more than 0 ppm and up to 1000 ppm. Examples of such inorganic residues include those selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. The amounts of inorganic residues can be from 250 to 1000 ppm, and more specifically from 500 to 1000 ppm.

The PET component from which the modified PBT is made can have a variety of forms. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. The PET component can also include other polyesters and/or polyester copolymers. Examples of such materials include poly(alkylene terephthalates) selected from the group consisting of poly(ethylene terephthalate), poly(cyclohexane dimethanol terephthalate), copolyesters of terephthalate esters with comonomers containing cyclohexanedimethanol and ethylene glycol, copolyesters of terephthalic acid with comonomers containing cyclohexane dimethanol and ethylene glycol, poly(xylylene terephthalate), poly(butylene terephthalate), poly(trimethylene terephthalate), poly(ester naphthalate), and combinations thereof.

Commercial examples of a modified PBT include those available under the trade name VALOX iQ PBT, manufactured by SABIC Innovative Plastics Company. The modified PBT can be derived from the poly(ethylene terephthalate) component by any method that involves depolymerization of the poly(ethylene terephthalate) component and polymerization of the depolymerized poly(ethylene terephthalate) component with 1,4-butanediol to provide the modified PBT. For example, the modified polybutylene terephthalate component can be made by a process that involves depolymerizing a poly(ethylene terephthalate) component selected from the group consisting of poly(ethylene terephthalate) and poly(ethylene terephthalate) copolymers, with a 1,4-butanediol component at a temperature from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at sub-atmospheric pressure and increasing the temperature of the molten mixture to an elevated temperature under conditions sufficient to form a modified PBT containing at least one residue derived from the poly(ethylene terephthalate) component.

A mixture of polyalkylene terephthalate resins with differing viscosities can be used to make a blend to allow for control of viscosity of the final formulation. A combination a virgin polyalkylene terephthalate (polyesters derived from monomers) and recycled or modified polyalkylene terephthalate can be utilized, including virgin and/or modified poly(1,4-butylene terephthalate) obtained from recycled polyethylene terephthalate, as described above.

The present composition can comprise a polyalkylene terephthalate content of 40 to 94 wt. %, specifically 49 to 84 wt. %, more specifically 50 to 75 wt. %, most specifically 55 to 70 wt. %, based on the total weight of the composition.

In addition to polyalkylene terephthalate, other polyesters can optionally be present in the composition (in an amount of less than 10 wt. % of the composition), provided that such polyesters do not significantly adversely affect the desired properties of the composition, specifically the resistance to thermal cycles.

In addition to the above-described components, other thermoplastic resin components of the thermoplastic composition can be used accessorily in a small amount, depending on the object. The other thermoplastic resin can be any resin providing it is stable at higher temperatures. For example, polyamides, polycarbonates, polyphenylene sulfide, polyphenylene oxide, polyacetal, acrylonitrile-styrene resin, acrylonitrile-butadiene-styrene resin, polysulfone, polyether sulfone, polyether imide, polyether ketone and fluorine resin. These thermoplastic resins can also be used in combination of two or more.

In one embodiment, polyolefin homopolymers, specifically polypropylene and/or polyethylene, are excluded from the present thermoplastic composition. In another embodiment, at least 80 wt. %, specifically at least 85 wt. %, more specifically at least 90 wt. % of total polymer in the thermoplastic composition consists of PBT polyester.

The thermoplastic composition of the present invention further comprises from 1 to 30 wt. % of an functionalized or non-functionalized block copolymer comprising a semi-crystalline polyolefin block and at least one of a vinyl aromatic polymer block and an elastomeric polyolefin block, also referred to herein as a "semi-crystalline-polyolefin-containing block copolymer," inclusive of functionalized and non-functionalized block copolymers. Such block copolymers include, for example, what has also be referred to as SEBC, functionalized SEBC, CEBC, and functionalized CEBC, wherein functionalization can include polar groups, specifically amine or epoxy groups, more specifically terminal epoxy groups.

In particular, the semi-crystalline-polyolefin-containing block copolymer can include those composed of at least one semi-crystalline polyethylene block (C) as a hard segment or block and, as soft blocks, at least one polybutadiene block (B), polyisoprene block (I), relatively random copolymer block of ethylene and butylene (EB), and/or relatively random copolymer block of ethylene and propylene (EP). Specifically, a soft block can include EB and/or EP, more specifically an EB block. The hard block content can specifically be 10 to 50% by weight of the block copolymer.

In one embodiment, the semi-crystalline-polyolefin-containing block copolymer is an epoxy-functionalized or non-functionalized styrene-ethylene/butylene-ethylene block copolymer or an ethylene-ethylene/butylene-ethylene block copolymer, wherein the ethylene blocks, specifically in one or both end blocks, are semi-crystalline.

Such block copolymers, for example, can include C-EB-C (CEBC) or S-EB-C (SEBC) obtained by selectively hydrogenating butadiene or a styrene-butadiene copolymer, wherein "C" refers to a semi-crystalline polyolefin block. The polybutadiene or styrene-butadiene copolymer used in hydrogenation can comprise a polybutadiene in which the butadiene structure contains 1,4 polymer blocks which are at least 95 wt. % composed of 1,4 units and in which the overall butadiene structure has a 1,4 unit content of at least 50 wt. %, and more specifically at least 80 wt. %. The degree of hydrogenation in the hydrogenation product, expressed as the percent of double bonds in the polybutadiene or styrene-butadiene copolymer that are converted to saturated bonds, can be 60 to 100%, and more specifically 90 to 100%.

In one embodiment the semi-crystalline-polyolefin-containing block copolymer has a number average molecular weight of about 30,000 to 800,000 and a melt index at 230° C., specifically 0.5 to 15 g/10 min, and more specifically to 7 g/10 min, as measured under a test load of 21.2 N (2.16 kgf) according to JIS K-6760. The term "semi-crystalline" can typically mean that the crystallinity of the semi-crystalline block is at least about 25%, specifically at least about 30%, more specifically at least about 40%, as determined by X-ray scattering.

The semi-crystalline-polyolefin-containing block copolymer can be terminated with a polar functional group capable of reacting with the polyester. Specifically, the end blocks can be modified with functional groups such as epoxy or amine, specifically epoxy. A variety of such semi-crystalline-polyolefin-containing block copolymers, comprising crystalline polyethylene blocks, are commercially available under the trademarks JSR DYNARON from JSR Corporation, Tokyo (JP), in various grades. For example, SEBC grades include DYNARON 4600P having a styrene content of 20 weight percent, a specific gravity of 0.91 g/cm$^3$, an MFR (JIS K6253 or ASTM 1238) of 5.5 g/10 min, and a glass transition temperature of −45° C. CEBC is available under the grades DYNARON 6100P, 6200P, and 6201B.

The semi-crystalline-polyolefin-containing block copolymer can be present in the composition in an amount from 1 to 30 wt. %, specifically from 1 to 20 wt. %, and more specifically from 1 to 10 wt. %, and most specifically from 2 to 8 wt. %, based on the total weight of the solid composition.

As indicated above, another aspect of the invention involves a composition comprising a combination of the semi-crystalline-polyolefin-containing block copolymer with a carboxy-reactive impact modifier. It has surprisingly been found that combination of such copolymers can provide an enhanced balance of desired properties. In a specific embodiment, the polymers in the resin composition consist only of polyester, carboxy-reactive impact modifier, and the semi-crystalline-polyolefin-containing block copolymer.

Thus, in one embodiment, the polyester compositions disclosed herein can also comprise a carboxy-reactive impact modifier in addition to the semi-crystalline-polyolefin-containing block copolymer, which carboxy-reactive impact modifier is a polyfunctional copolymer (including oligomers) that comprises carboxy-reactive groups selected from epoxides, carbodiimides, orthoesters, oxazolines, oxiranes, aziridines, and anhydrides. The carboxy-reactive impact modifier can also include other functionalities that are either reactive or non-reactive under the described processing conditions. If desired, a catalyst or co-catalyst system can be used to accelerate the reaction between the carboxy-reactive material and the polyester.

The term "polyfunctional" or "multifunctional" in connection with the carboxy-reactive impact modifier means that at least two carboxy-reactive groups are present in each molecule of the material, specifically at least two reactive epoxy groups. Examples include epoxy novolac resins, epoxidized vegetable (e.g., soybean, linseed) oils, tetraphenylethylene epoxide, styrene-acrylic copolymers containing pendant glycidyl groups, and glycidyl methacrylate-containing polymers and copolymers.

Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl C1-4(alkyl)acrylate, allyl glycidyl ethacrylate, and glycidyl itaconate).

For example, in one embodiment, the carboxy-reactive impact modifier is a styrene-acrylic copolymer containing glycidyl groups incorporated as side chains. Several useful examples are described in International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain can be present, for example, at least about 10, specifically greater than about 15, more specifically greater than about 20. These polymeric materials can have a molecular weight greater than about 3000, specifically greater than about 4000, and more specifically greater than about 6000. Such impact modifiers are commercially available from Johnson Polymer, LLC under the JONCRYL® trade name, specifically JONCRYL® ADR 4368 polymer product.

In another embodiment, the carboxy-reactive copolymer is the reaction product of an epoxy-functional C1-4 (alkyl) acrylic monomer with a non-functional styrenic and/or C1-4 (alkyl)acrylate and/or olefin monomer. In another embodiment, the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth)acrylate includes both acrylate and methacrylate monomers. Examples of specific epoxy-functional (meth) acrylic monomers include, but are not limited to, those containing 1,2-epoxy groups such as glycidyl acrylate and glycidyl methacrylate. The C1-4(alkyl)acrylate comonomers can include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Styrenic monomers can include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene. Olefinic monomers can include, but are not limited to, ethylene, propylene, butylene, or other olefinic monomer.

Epoxy-functional copolymers that can serve as carboxy-reactive impact modifiers are available from Dow Chemical Company under the trademarks D.E.R.332, D.E.R.661, and D.E.R.667; from Resolution Performance Products under the trade name EPON Resin 1001F, 1004F, 1005F, 1007F, and 1009F; from Shell Oil Corporation under the trade names EPON 826, 828, and 871; from Ciba-Giegy Corporation under the trade names CY-182 and CY-183; and from Dow Chemical Co. under the tradename ERL-4221 and ERL-4299. Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER.

In a specific embodiment, the carboxy-reactive impact modifier is an epoxy-functional copolymer comprising units derived from a C2-6 olefin and units derived from a glycidyl (meth)acrylate. Exemplary olefins include ethylene, propylene, butylene, glycidyl methacrylate, methyl acrylate, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene. Particularly suitable impact modifiers are derived from C2-4 olefins. In addition to glycidyl(meth)acrylate units, the copolymers can further comprise additional units, for example C1-4alkyl(meth)acrylate units. A terpolymer can comprise polyethylene blocks, methyl methacrylate blocks, and glycidyl methacrylate blocks. Such terpolymers can comprise, based on the total weight of the copolymer, 0.3 to 12 weight percent of glycidyl methacrylate units, more specifically 0.4 to 11 weight percent of glycidyl methacrylate units, even more specifically 0.5 to 10 weight percent of glycidyl methacrylate units. A specific glycidyl ester impact modifier has about 67 wt. % ethylene, 25 wt. % methyl methacrylate, and 8 wt. % glycidyl methacrylate units, and is available from Atofina under the brand name LOTADER AX8900, The carboxy-reactive impact modifier can be added to the polyester compositions in amounts effective to improve measured physical properties. In one embodiment, the carboxy-reactive materials are added to the polyester compositions in an amount effective to improve the impact resistance of the composition without unduly adversely affecting the improvement in heat cycle resistance. A person skilled in the art can determine the optimum type and amount of any given carboxy-reactive material without undue experimentation, using the guidelines provided herein.

The thermoplastic polyester composition also comprises at least one reinforcing filler. For example reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used.

Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 μm, specifically 8-18 μm is impregnated with melted PBT polyester. After cooling, the impregnated bundle is cut into pellets having a length of >5 mm, specifically, above >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 5 to 50 wt. %, specifically from 10 to 45 wt. %, more specifically from 20 to 40 wt. %, and most specifically, from 25 to 35 wt. %.

In still other embodiments, the compositions can optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

When present, the particulate filler is used in an amount between zero and 20 wt. %, specifically between 0 to 10 wt. %, more specifically between 0.1 to 5 wt. %.

Further, in the resin composition of the present invention, there can be compounded known substances, which are generally added to thermoplastic resins and thermosetting resins, for example, stabilizers such as antioxidants and ultraviolet ray absorbers, as described below and other additives for the purpose of imparting desired properties corresponding to the product being made.

For example, a stabilizer component is optionally present in the polyester composition, in an amount from more than 0 to 3 wt. %, specifically 0.001 to 2 wt. %, even more specifically 0.005 to 1.5 wt. %. As used herein, a "stabilizer" is inclusive of an antioxidant, thermal stabilizer, radiation stabilizer, ultraviolet light absorbing additive, and the like, and combinations thereof. In one embodiment, the stabilizer component comprises an antioxidant.

Exemplary antioxidants include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. A specific antioxidant is a hindered phenol stabilizer, pentaerythritol tetrakis(3,5-di-tert-butyl-4-hydroxyhydrocinnamate), sold under the trade name IRGANOX® 1010 from Ciba Specialty Chemicals.

Exemplary heat stabilizer additives include organophosphites such as triphenyl phosphite, tris-(2,6-dimethylphenyl) phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers can be used in amounts of 0.01 to 5 parts by weight, based on 100 parts by weight of the total composition, excluding any filler.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 parts by weight, based on 100 parts by weight of the total composition, excluding any filler.

With the proviso that heat cycle resistant properties and mechanical properties such as tensile properties are not significantly adversely affected, the compositions can further comprise other conventional additives used in polyester polymer compositions such as mold release agents, plasticizers, quenchers, lubricants, antistatic agents, processing aids, dyes, pigments, laser marking additives, and the like. A combination comprising one or more of the foregoing or other additives can be used. Plasticizers, lubricants, and/or mold release agents can be specifically mentioned. There is considerable overlap among these types of materials, which include phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 parts by weight, based on 100 parts by weight of the total composition, excluding any filler. An exemplary mold release agent is pentaerythritol tetrastearate, available from Faci SpA.

In one embodiment, the polyester composition contains a flame-retarding component. The flame-retarding component can be added the polyester composition to suppress, reduce, delay or modify the propagation of a flame through the composition or an article based on the composition. The flame-retarding component can comprise halogenated hydrocarbons, inorganic flame retardants, phosphorous-containing compounds, and nitrogen-containing compounds.

Inorganic flame retardants can include metal hydroxides, antimony compounds, boron compounds, phosphorous compounds, or other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, as well as others.

Examples of suitable halogenated organic flame retardants can include brominated flame retardants and chlorinated flame retardants. Examples of such flame retardants include tetrabromobisphenol A, bis(tribromophenoxy)ethane, tribromophenol, bis(tribromophenoxy)ethane tetrabromobisphenol A polycarbonate oligomers, and tetrabromobisphenol A epoxy oligomers. Halogenated aromatic flame-retardants can include tetrabromobisphenol A polycarbonate oligomer, polybromophenyl ether, brominated polystyrene, brominated BPA polyepoxide, brominated imides, brominated polycarbonate, poly(haloaryl acrylate), poly(haloaryl methacrylate), or mixtures thereof.

Examples of other flame retardants are brominated polystyrenes such as poly-dibromostyrene and polytribromostyrene, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis(hexachlorocyclopentadieno)cyclo-octane as well other such functionally equivalent materials.

Examples of suitable phosphorous flame retardants include red phosphorus and ammonium polyphosphate.

Organophosphorous flame retardants can include halogenated or non-halogenated phosphates. Examples of such materials include tris(1-chloro-2-propyl) phosphate, tris(2-chloroethyl) phosphate, tris(2,3-dibromopropyl) phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines, phosphine oxides, phosphinates, and phosphites.

Exemplary flame-retarding compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When present, phosphorus-containing flame retardants are generally present in amounts of about 1 to about 20 parts by weight, based on 100 parts by weight of the total composition.

In one embodiment, the composition includes a flame retarding quantity of one or a mixture of nitrogen-containing flame retardants such as triazines, guanidines, cyanurates, and isocyanurates. Suitable triazines have the formula:

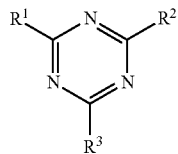

wherein $R^1$, $R^2$, and $R^3$ are independently C1-C12 alkyl, C1-C12 alkoxyl, C6-C12 aryl, amino, C1-C12 alkyl-substituted amino, or hydrogen. Triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid can be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants can be used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). Such phosphinates have the formula (I)

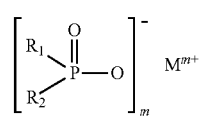

and/or formula II

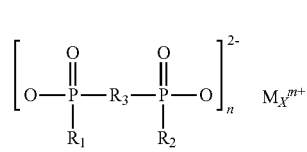

and or polymers comprising such formula I or II, where $R_1$ and $R_2$ are identical or different and are H, C1-C6-alkyl, linear or branched, and/or aryl; $R_3$ is C1-C10, alkylene, linear or branched, C6-C10-arylene, -alkylarylene or -arylalkylene; M is any metal, specifically magnesium, calcium, aluminum or zinc, m is 1, 2 or 3; n is 1, 2 or 3; and x is 1 or 2.

In one embodiment, $R_1$ and $R_2$ can be H. This results in a hypophosphite, a subset of phosphinate, such as calcium hypophosphite, aluminum hypophosphite and the like.

The flame retardants can be used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sn_2O_3$). Synergists, such as antimony oxides, can be used at about 0.5 to 15 by weight based on the weight percent of resin in the final composition.

Also, the polyester composition can contain polytetrafluoroethylene (PTFE) type resins or copolymers used to reduce dripping in flame-retarding thermoplastics. For example, an antimony oxidant can be used with brominated fire retardants such as a brominated polycarbonate, brominated epoxy, brominated polystyrene, or other brominated fire retardants, further in combination with PTFE. An example of a non-halogenated fire-retarding component composition comprises aluminum diethylphosphinic acid in combination with melamine polyphosphate and PTFE.

In one embodiment, flame-retardant additives are present in the resin composition in an amount at least sufficient to reduce the flammability of the resin, specifically to a UL94 V-0 rating. The amount will vary with the exact formulation of the composition and with the efficiency of the additive. The amount of the flame retarding component can be, for example, at least 1 wt. %. In one embodiment, the amount of the flame retarding component ranges from 1 wt. % to 30 wt. %, specifically 2 to 20 wt. %.

The compositions can be prepared by blending the components of the thermoplastic composition, employing a number of procedures. In an exemplary process, the polyalkylene terephthalate, the semi-crystalline-polyolefin-containing block copolymer, the reinforcing filler, and any optional components are placed into an extrusion compounder to produce molding pellets. The components are dispersed in a matrix in the process. In another procedure, the components and reinforcing filler are mixed by dry blending, and then fluxed on a mill and comminuted, or extruded and chopped. The composition and any optional components can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

An insert-molded article can be molded from the thermoplastic polyester composition as described herein. Such article can include computer, electronic, electrical, and automotive parts. The term "automotive" refers to applications with respect to any vehicle of transportation, for example cars, trucks, motor bicycles, boats, and sport vehicles.

Such insert-molded article is a composite molded article obtained by charging previously a metal or the like into a metal mold for molding, and filling the above-described thermoplastic composition onto the outside thereof. For filling a resin composition in a mold, methods include injection molding, extrusion molding, compression molding and the like. Since the material inserted into a resin is used for the purpose of compensating limits or defects of the resin while utilizing the additive properties thereof, those that are not deformed or melted when coming into contact with the resin are used. Therefore, those which mainly comprise metals such as aluminum, magnesium, copper, iron, brass, including alloys thereof, which are previously molded into bars, pins, screws and the like, are used. Other solid inorganic materials, including glass or ceramic parts, can also be present. In the final article, the resin composition, directly adjacent the surface of the metal part, can partially, substantially completely, or completely surround the metal part.

As described above, the composition of the present invention is extremely excellent in terms of heat shock property and the like, so that an insert-molded article molded using this composition can endure high and low temperature change for a long period of time. Consequently, they can suitably be used for automobile parts, even parts around an engine.

These thermoplastic polyester compositions can meet certain targeted performance properties with respect to a menu of properties comprising two or more of (a) tensile strength greater than 600 kg/cm², specifically greater than 700 kg/cm² as measured in accordance with ASTM D638, (b) tensile elongation at break of greater than 3 percent, specifically 4 to 15 percent, and (c) MFI (ASTM 1238) melt low index properties of greater than 30 g/min, more specifically 30 to 130 g/min and, more specifically 40 to 120 g/min and, when used in an insert-molded article, (d) a heat cycle rating of less than or equal to 6 cracked holes after 385 cycles. Specifically, a heat cycle rating can be obtained of less than or equal to 5 cracked holes after 385 cycles. In addition, a heat cycle rating can be obtained of less than or equal to 1 cracked hole after 50 cycles, specifically zero cracked holes after 50 cycles, and less than or equal to 4 (more specifically zero) cracked holes after 135 cycles.

In a specific embodiment, the filled polyester composition can have a combination of highly useful physical properties, namely simultaneously the following properties: (a) tensile strength less than 600 kg/cm² as measured in accordance with ASTM D638, (b) tensile elongation at break of greater than 3% as measured in accordance with ASTM D638, (c) MFI (ASTM 1238) flow properties of greater than 30 g/10 min, and, when used in an insert-molded article, (d) a heat cycle rating of less than or equal to 6 cracked holes after 385 cycles, specifically less than or equal to 5 cracked holes after 385 cycles.

Specifically, a standard insert-molded article comprising the composition can exhibit a heat cycle rating of less than or equal to 6 cracked hole after 385 cycles and, furthermore, less than or equal to 3 cracked holes after 135 cycles and less than or equal to 1 cracked holes after 50 cycles.

More specifically, a standard insert-molded article and its thermoplastic polyester composition can exhibit simultaneously the following properties: (a) tensile strength of greater than 700 kg/cm² as measured in accordance with ASTM 638 (b) tensile elongation at break of 4 to 15% as measured in accordance with ASTM D638, (c) MFI (melt flow index, ASTM 1238) of 30 to 130 g/10 min, and (d) a heat cycle rating of less than or equal to 5 cracked holes after 385 cycles. Specifically, an insert-molded article comprising the thermoplastic polyester composition can exhibit a heat cycle rating of less than or equal to 4 cracked holes after 385 cycles, less than or equal to 3 (more specifically zero) cracked holes after 135 cycles, and/or a heat cycle rating of less than or equal to 1 (more specifically zero) cracked hole after 50 cycles.

In one embodiment, a standard insert-molded article and its polyester composition, comprising a combination of functionalized semi-crystalline elastomeric olefinic/styrene-olefinic block copolymer and carboxy-reactive impact modifier, can exhibit a combination of the following properties: (a) tensile strength of greater than 900 kg/cm², specifically greater than 950 to 1200 kg/cm² as measured in accordance with ASTM D638, (b) elongation at break, as measured in accordance with ASTM D638, of greater than 3 percent, (c) MFI (ASTM) of 30 to 120 g/10 min, and (d) a heat cycle rating of less than or equal to 6 cracked holes after 385 cycles.

The invention is further illustrated by the following non-limiting examples, in which all parts are by weight unless otherwise stated.

EXAMPLES

Materials

The following materials, provided in Table 1, were used to prepare the formulas of Examples 1 to 11 (i.e., Ex. 1 to 11) and Comparative Examples 1 to 8 (i.e., CEx. 1 to 8) as provided in Tables 2-4. These formulas were prepared as follows.

Extrusion/Molding Procedures

The components of each of the formulas of Examples 1-11 and of Comparative Examples 1-8, in amounts expressed in percent weight, based on the total weight of the polymer composition, were blended together in a super-floater and then extruded on a 44-mm twin-screw extruder with a vacuum vented mixing screw, at a barrel temperature set at 250° C. and a screw speed of 200 rpm and throughput rate of 100 kg per hour. The extruded pellets were dried at 120° C. for two hours before injection molding.

The melt viscosity, tensile elongation, tensile strength, flexural modulus, flexural strength, notched Izod impact strength, and HDT (Heat Deflection Temperature) were determined in accordance with ASTM methods, as described below.

TABLE 1

Abbreviation, Description and Sources of Materials

| Abbreviation | Description | Source | Tradenames |
|---|---|---|---|
| PBT-1 | Intrinsic viscosity = 0.736-0.765 dl/g (ASTM D-2857) Mn = 53400 g/mol | Chang Chun Plastics Co., Ltd. | 1200-211D |
| PBT-2 | Intrinsic viscosity = 1.23-1.30 dl/g, (ASTM D-2857) Mn = 110,000 g/mol | Chang Chun Plastics Co., Ltd. | 1100-211X |
| Glass Fiber | 13-micron diameter | Nippon Electric Glass Co., Ltd. | T-120 |
| SEBS | Polystyrene-block-poly(ethylene/butylene)-block polystyrene block | Shell Chemical Co. | KRATON G1651 |
| Epoxy-SEBS | Epoxy-functionalized polystyrene-block-poly(ethylene/butylene)-block polystyrene block | JSR Corporation | DYNARON 8630P |
| E-MA-GMA | Ethylene-methacrylate-glycidyl methacrylate | Arkema | LOTADER AX8900 |
| Epoxy-SEBC | Epoxy-functionalized polystyrene-block-poly(ethylene/butylene)-block-crystalline block | JSR Corporation | DYNARON 4630P |
| SEBC | Polystyrene-block-poly(ethylene/butylene)-block-crystalline block | JSR Corporation | DYNARON 4600P |
| Stabilizer-1 | Tetrakis[methylene-3-(3',5'-di-t-butyl-4-hydrodroxyphenyl)-propionate]methane | Everspring Chemicals Co., Ltd. | EVERNOX-10 |
| Stabilizer-2 | Tetrakis[methylene-3-(dodecylthio)propionate]Methane | Shipro Kasei Kaisha, Ltd. | SEENOX412S |
| Stabilizer-3 | Tris(2,4-di-t-butyl phenyl)phosphite | Everspring Chemicals Co., Ltd. | EVERFOS-168 |

General Testing Techniques and Procedures:

Each test piece, or specimen, was first annealed at 125° C. for 2 hours immediately before the heat cycle resistant test. The heat cycle resistant test was then conducted at the heat cycle of −40° C. for 30 minutes immediately followed by 150° C. for 30 minutes, for the number of cycles specified. Each test specimen was as illustrated by views of the front side, back side, and lateral side, respectively, in FIGS. 1A, 1B, 1C. The outer dimensions of the resin portion 2 was 60 mm×80 mm×3.5 mm, and the dimensions of the inserted steel metal part 1 were 50 mm×70 mm×1 mm. Each test specimen was insert molded at a resin temperature of 260° C. and a mold temperature of 60° C. with a 70t molding machine from MEIKI CO., LTD., model M-70C-AS-M-DM. Each test specimen contained eight holes extending to the surface of the inserted metal, four on each face side, as shown in FIGS. 1A and 1C taken along line Y-Y. A side gate 3 is diagrammatically shown. A window 5, to simulate a type or shape for a particular application, was located in the back side of each test specimen. Three test specimens were tested for each example. The cracks in the test specimens were observed by OM (Optical Microscope) for cycles of 50, 135, 250 and 385. The cracked holes were then counted, in Examples 1-11 and Comparative Examples 1-8. The number of test specimens that had metal line cracks was also counted for Examples 1-11. By definition, a "metal line crack" occurs along a metal-to-resin borderline, and a "hole crack" occurs at the weld line in the outline of a hole.

ASTM Izod and flexural bars were injection molded on a JSW (Japan Steel Works, Ltd.) molding machine with a set temperature of approximately 240° C. to 265° C. The pellets were dried for 3 to 4 hours at 120° C. in a forced air-circulating oven before injection molding.

Notched Izod testing was performed on 75 mm×12.5 mm×3.2 mm bars in accordance with ASTM D256. Flexural properties were measured in accordance with ASTM 790 on molded samples having a thickness of 6.4 mm Tensile properties, including tensile strength and elongation at break, were tested on 7×⅛ inch injection molded bars at room temperature with a crosshead speed of 10 mm/min by using ASTM D638.

The heat distortion temperature (also known as HDT) test was performed by placing samples under a load of 1.8 MPa while exposed to a heating rate of 120° C./hour in accordance with ASTM D648. Melt flow properties were based on Melt Flow Index (MFI according to ASTM D1238) on pellets, dried for 2 hours at 120° C. prior to measurement, at 250° C. and 5 kgf at dwelling time of 240 seconds and a 0.0825 inch (2.1 mm) orifice.

Examples 1-2 and Comparative Examples 1-3

In Table 2, the properties and performance of polyester formulas containing polybutylene terephthalate, glass fiber and styrene-ethylene/butylene-styrene block copolymer (SEBS) or semi-crystalline styrene-ethylene/butylene-polyethylene block copolymer (SEBC) were compared in terms of (i) Notched Izod impact strength (ii) tensile strength, (iii) tensile elongation, (iv) flexural strength (v) flexural modulus, (vi) heat deflection temperature, (vii) melt flow properties, and especially (viii) heat cycle resistance.

In Table 3, the properties and performance of polyester formulas containing polybutylene terephthalate, glass fiber, and epoxy-functionalized styrene-ethylene/butylene-styrene block copolymer (epoxy-SEBS) or epoxy-functionalized semi-crystalline styrene-ethylene/butylene-ethylene block copolymer (epoxy-SEBC) were, again, compared in terms of (i) Notched Izod impact strength (ii) tensile strength, (iii) tensile elongation, (iv) flexural strength (v) flexural modulus, (vi) heat deflection temperature, (vii) melt flow properties, and especially (viii) heat cycle resistance.

In Table 4, the properties and performance of polyester formulas containing polybutylene terephthalate, glass fiber, and ethylene-methacrylate-glycidyl methacrylate impact modifier, by itself, or in combination with semi-crystalline epoxy-SEBC or SEBC were compared in terms of (i) Notched Izod impact strength (ii) tensile strength, (iii) tensile elongation, (iv) flexural strength (v) flexural modulus, (vi) heat deflection temperature, (vii) melt flow properties, and especially (viii) heat cycle resistance.

TABLE 2

|  |  | CEx. 1 | CEx. 2 SEBS | CEx. 3 | Ex. 1 SEBC | Ex. 2 |
|---|---|---|---|---|---|---|
| PBT-1 |  | 44.65 | 54.65 | 59.65 | 59.65 | 64.65 |
| PBT-2 |  | 10 | 0 | 0 | 0 | 0 |
| Glass Fiber |  | 30 | 30 | 30 | 30 | 30 |
| SEBS |  | 15 | 15 | 10 | 0 | 0 |
| SEBC |  | 0 | 0 | 0 | 10 | 5 |
| Stabilizer-1 |  | 0.1 | 0.1 | 0.1 | 0.1 | 0.1 |
| Stabilizer-2 |  | 0.2 | 0.2 | 0.2 | 0.2 | 0.2 |
| Stabilizer-3 |  | 0.05 | 0.05 | 0.05 | 0.05 | 0.05 |
| Heat Cycle Test Cracked Holes | 50 cycles | 6 | 7 | 3 | 3 | 0 |
|  | 135 cycles | 12 | 12 | 11 | 6 | 2 |
|  | 250 cycles | 12 | 12 | 12 | 6 | 2 |
|  | 385 cycles | 12 | 12 | 12 | 6 | 2 |
| Specimens with metal line cracks | 50 cycles | N/A | N/A | N/A | 0 | 0 |
|  | 135 cycles | N/A | N/A | N/A | 0 | 3 |
|  | 250 cycles | N/A | N/A | N/A | 3 | 3 |
|  | 385 cycles | N/A | N/A | N/A | 3 | 3 |
| Notched Izod | kgcm/cm | 14.3 | 13.4 | 14.1 | 6.4 | 5.1 |
| Tensile Strength | kg/cm$^2$ | 898 | 883 | 1006 | 720 | 757 |
| Tensile Elongation at Break | % | 6 | 6 | 4 | 4 | 4 |
| Flexural Strength | kg/cm$^2$ | 1349 | 1374 | 1528 | 1182 | 1245 |
| Flexural Modulus | kg/cm$^2$ | 62811 | 61438 | 67852 | 56428 | 58633 |
| HDT, 18.6 kg/cm$^2$ | ° C. | 201.9 | 202.7 | 205.7 | 187.1 | 187.2 |
| MFI, 250° C./5 kg | g/10 min | 23.4 | 32 | 33.7 | 93.9 | 114 |
| Specific Gravity |  | 1.42 | 1.42 | 1.46 | 1.46 | 1.5 |

TABLE 3

|  |  | CEx. 4 Epoxy-SEBS | Ex. 3 | Ex. 4 epoxy-SEBC | Ex. 5 | Ex. 6 |
|---|---|---|---|---|---|---|
| PBT-1 |  | 49.65 | 59.65 | 62.15 | 64.65 | 67.15 |
| PBT-2 |  | 10 | 0 | 0 | 0 | 0 |
| Glass Fiber |  | 30 | 30 | 30 | 30 | 30 |
| epoxy-SEBS |  | 10 | 0 | 0 | 0 | 0 |
| epoxy-SEBC |  | 0 | 10 | 7.5 | 5 | 2.5 |
| Stabilizer-1 |  | 0.1 | 0.1 | 0.1 | 0.1 | 0.1 |
| Stabilizer-2 |  | 0.2 | 0.2 | 0.2 | 0.2 | 0.2 |
| Stabilizer-3 |  | 0.05 | 0.05 | 0.05 | 0.05 | 0.05 |
| Heat Cycle Test Cracked Holes | 50 cycles | 3 | 0 | 0 | 0 | 0 |
|  | 135 cycles | 9 | 4 | 3 | 0 | 0 |
|  | 250 cycles | 11 | 6 | 5 | 1 | 0 |
|  | 385 cycles | 11 | 6 | 5 | 1 | 0 |
| Specimens with metal line cracks | 50 cycles | N/A | 0 | 0 | 0 | 0 |
|  | 135 cycles | N/A | 0 | 1 | 3 | 3 |

TABLE 3-continued

|  |  | CEx. 4 Epoxy-SEBS | Ex. 3 | Ex. 4 epoxy-SEBC | Ex. 5 | Ex. 6 |
|---|---|---|---|---|---|---|
|  | 250 cycles | N/A | 3 | 3 | 3 | 3 |
|  | 385 cycles | N/A | 3 | 3 | 3 | 3 |
| Notched Izod | kgcm/cm | 8.5 | 6.2 | 5.3 | 5 | 4.7 |
| Tensile Strength | kg/cm$^2$ | 706 | 704 | 704 | 741 | 786 |
| Tensile Elongation at Break | % | 4 | 5 | 4 | 4 | 4 |
| Flexural Strength | kg/cm$^2$ | 1134 | 1147 | 1165 | 1226 | 1327 |
| Flexural Modulus | kg/cm$^2$ | 40152 | 56243 | 58323 | 58910 | 61604 |
| HDT, 18.6 kg/cm$^2$ | ° C. | 191.7 | 189.4 | 190.6 | 188.9 | 189.8 |
| MFI, 250° C./5 kg | g/10 min | 66.9 | 77.7 | 89.4 | 102.8 | 116.5 |
| Specific Gravity |  | 1.45 | 1.45 | 1.47 | 1.49 | 1.51 |

TABLE 4

|  |  | CEx. 5 | CEx. 6 E-MA-GMA | CEx 7 | CEx. 8 Non-GF | Ex. 7 | Ex. 8 E-MA-GMA + epoxy-SEBC | Ex. 9 | Ex. 10 | Ex. 11 E-MA-GMA + SEBC |
|---|---|---|---|---|---|---|---|---|---|---|
| PBT-1 |  | 49.65 | 62.15 | 64.65 | 91.65 | 59.65 | 61.65 | 60.9 | 64.65 | 61.65 |
| PBT-2 |  | 10 |  |  |  |  |  |  |  |  |
| Glass Fiber |  | 30 | 30 | 30 | 0 | 30 | 30 | 30 | 30 | 30 |
| E-MA-GMA |  | 10 | 7.5 | 5 | 5 | 5 | 5 | 1.875 | 2.5 | 5 |
| epoxy-SEBC |  | 0 | 0 | 0 | 3 | 5 | 3 | 6.875 | 2.5 | 0 |
| SEBC |  | 0 | 0 | 0 | 0 | 0 | 0 | 0 | 0 | 3 |
| Stabilizer1 |  | 0.1 | 0.1 | 0.1 | 0.1 | 0.1 | 0.1 | 0.1 | 0.1 | 0.1 |
| Stabilizer2 |  | 0.2 | 0.2 | 0.2 | 0.2 | 0.2 | 0.2 | 0.2 | 0.2 | 0.2 |
| Stabilizer3 |  | 0.05 | 0.05 | 0.05 | 0.05 | 0.05 | 0.05 | 0.05 | 0.05 | 0.05 |
| Heat Cycle Test Cracked Holes | 50 cycles | 0 | 0 | 0 | 12 | 0 | 0 | 0 | 0 | 0 |
|  | 135 cycles | 5 | 2 | 2 | 12 | 0 | 0 | 0 | 0 | 4 |
|  | 250 cycles | 10 | 5 | 4 | 12 | 2 | 0 | 1 | 3 | 7 |
|  | 385 cycles | 12 | 11 | 12 | 12 | 5 | 3 | 4 | 11 | 11 |
| Specimens with metal line cracks | 50 cycles | N/A | N/A | N/A | N/A | 0 | 0 | 0 | 0 | 0 |
|  | 135 cycles | N/A | N/A | N/A | N/A | 0 | 0 | 0 | 0 | 0 |
|  | 250 cycles | N/A | N/A | N/A | N/A | 0 | 0 | 0 | 0 | 0 |
|  | 385 cycles | N/A | N/A | N/A | N/A | 0 | 0 | 0 | 0 | 0 |
| Notched Izod | kgcm/cm | 17.5 | 16.9 | 14.7 | 5.76 | 13 | 12.5 | 11.8 | 10.5 | 13 |
| Tensile Strength | kg/cm$^2$ | 1020 | 1147 | 1232 | 429 | 1019 | 1070 | 1017 | 1140 | 1087 |
| Tensile Elongation at Break | % | 4 | 4 | 4 | 18 | 4 | 4 | 4 | 4 | 4 |
| Flexural Strength | kg/cm$^2$ | 1456 | 1694 | 1821 | 685 | 1602 | 1671 | 1592 | 1751 | 1681 |
| Flexural Modulus | kg/cm$^2$ | 63842 | 67336 | 74685 | 20371 | 68900 | 72555 | 70628 | 75665 | 71651 |
| HDT, 18.6 kg/cm$^2$ | ° C. | 207 | 208.2 | 209.7 | 54 | 205.4 | 206.7 | 206.4 | 207.4 | 206.3 |
| MFI, 250° C./5 kg | g/10 min | 27.3 | 53.3 | 57.1 | 184.7 | 47.1 | 42.1 | 33.1 | 51.8 | 52.3 |
| Specific Gravity |  | 1.47 | 1.48 | 1.51 | 1.27 | 1.46 | 1.48 | 1.47 | 1.5 | 1.48 |

Discussion

The results shown in Tables 2-4 indicate that a glass-filled polyester composition can be made containing the semi-crystalline-polyolefin-containing block copolymer with a heat cycle rating of less than or equal to 7 cracked holes after 385 cycles, less than or equal to 3 cracked holes after 135 cycles, and less than or equal to 1 cracked holes after 50 cycles. The compositions of Comparative Examples 1-8 do not meet these properties. Furthermore, other useful properties, namely, a tensile strength of over 600 kg/cm$^2$ as measured in accordance with ASTM D638 in combination with a tensile elongation at break of greater than 3 percent were obtained. An MFI flow property of greater than 30 g/10 min was also obtained for Examples 1 to 11.

It can also be seen, in Examples 1-9, that when SEBC or epoxy-SEBC is included in the formula with polybutylene terephthalate and glass fiber, heat cycle testing for 385 cycles resulted in 6 cracked holes or less. In contrast, Comparative Examples 1-7, containing polybutylene terephthalate and glass fiber in addition to SEBS (in amounts ranging from 10 to 15 weight percent), epoxy-SEBS, or E-MA-GMA alone (in amounts ranging from 5 to 10 weight percent) could improve mechanical properties such as tensile elongation or impact strength slightly, but the formulas did not provide a heat cycle rating of less than or equal to 6 cracked holes after 385 cycles. In most cases, the comparative examples all showed 9 or more cracked holes after 385 cycles.

Further, regarding Examples 1-11, improvement in heat cycle rating was further demonstrated by whether the test specimens exhibited metal line cracks. The results also illustrate that the use of a single elastomer of epoxy-SEBC (Examples 3-6), generally had less cracked holes than formulas containing an equivalent amount of SEBC (Examples 1-2) This is particularly significant because the mechanical properties were otherwise similar, i.e. the impact strength, tensile strength, tensile elongation, flexural strength, flexural modulus, and melt flow properties were generally similar.

Formulas which contained the E-MA-GMA impact modifier in combination with epoxy-SEBC (Examples 7-10) or with SEBC (Example 11) were found to have improved impact strength, tensile strength, flexural strength, and flexural modulus, as well as reduced metal line cracks, although not in every case with respect to number of cracked holes, specifically for the particular formulas of Examples 10-11 when SEBC was combined with E-MA-GMA or a relatively small amount of epoxy-SEBC was present. Comparative Example 8, without glass fibers, was much worse versus Example 8 with respect to the number of cracked holes and impact strength.

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic polyester composition comprising, based on the total weight of the composition:
   from 49 to 88 wt. % of polyalkylene terephthalate;
   from 1 to 20 wt. % of an epoxy-functional block copolymer comprising a semi-crystalline polyolefin block having a crystallinity of at least about 25% as determined by X-ray scattering and further comprising a vinyl aromatic polymer block, an elastomeric polyolefin block, or combinations thereof;
   from 1 to 20 wt. % of carboxy-reactive impact modifier; and
   from 10 to 40 wt. % of reinforcing filler.

2. The thermoplastic polyester composition of claim 1, wherein the epoxy functionalized block copolymer is selected from the group consisting of an epoxy-functionalized styrene-ethylene/butylene-ethylene block copolymer and an epoxy-functionalized ethylene-ethylene/butylene-ethylene block copolymer, wherein each terminal ethylene refers to a semi-crystalline polyethylene block, and wherein the carboxy-reactive impact modifier is an epoxy-functional copolymer comprising repeat units derived from glycidyl methacrylate.

3. The thermoplastic polyester composition of claim 2, wherein the carboxy-reactive impact modifier is an epoxy-functionalized terpolymer of ethylene, glycidyl methacrylate, and methyl methacrylate.

4. The thermoplastic polyester composition of claim 1 wherein the epoxy-functional block copolymer is a an epoxy-functionalized styrene-ethylene/butylene-ethylene block copolymer, wherein the terminal ethylene refers to a semi-crystalline polyethylene block, and wherein the carboxy-reactive impact modifier is an epoxy-functionalized copolymer comprising ethylene, glycidyl methacrylate, and methyl acrylate, and wherein the reinforcing filler is a glass fiber having a length of 0.01 to 10 mm and a diameter of 6 to 24 μm.

5. An insert-molded article comprising a molded thermoplastic polyester containing a metal part, wherein thermoplastic polyester composition comprises, based on the total weight of the composition:
   from 40 to 94 wt. % of a polyalkylene terephthalate;
   from 1 to 30 wt. % of a functionalized or non-functionalized block copolymer comprising a semi-crystalline polyolefin block having a crystallinity of at least about 25% as determined by X-ray scattering and further comprising a vinyl aromatic polymer block an elastomeric polyolefin block, or combinations thereof; and
   from 5 to 50 wt. % of a reinforcing filler.

6. The insert-molded article of claim 5, wherein the block copolymer is an epoxy-functionalized or non-functionalized styrene-ethylene/butylene-ethylene block copolymer or an epoxy functionalized or non-functionalized ethylene-ethylene/butylene-ethylene block copolymer, wherein each terminal ethylene refers to a semi-crystalline polyethylene block.

7. The insert-molded article of claim 5, further comprising a carboxy-reactive impact modifier that is an epoxy-functional copolymer comprising repeat units derived from glycidyl methacrylate.

8. The insert molded article of claim 5 wherein the thermoplastic polyester composition comprises, based on the total weight of the composition:
   from 49 to 88 wt. % of polyalkylene terephthalate;
   from 1 to 20 wt. % of an epoxy-functionalized block copolymer comprising a semi-crystalline polyolefin block having a crystallinity of at least about 25% as determined by X-ray scattering and further comprising a vinyl aromatic polymer block an elastomeric polyolefin block, or combinations thereof;
   from 1 to 20 wt. % of a carboxy-reactive impact modifier; and
   from 10 to 40 wt. % of glass fiber.

9. The insert molded article of claim 5 wherein the article exhibits a heat cycle rating of less than or equal to 6 cracked holes after 385 cycles.

10. The thermoplastic polyester composition of claim 6, wherein the article exhibits a heat cycle rating of zero metal line cracks after 385 cycles.

\* \* \* \* \*